(12) United States Patent
Staffel et al.

(10) Patent No.: US 9,871,252 B2
(45) Date of Patent: Jan. 16, 2018

(54) METHOD FOR PRODUCING LITHIUM METAL PHOSPHATE

(71) Applicant: BK GIULINI GMBH, Ludwigshafen (DE)

(72) Inventors: Thomas Staffel, Grünstadt (DE); Siegbert Weber, Ladenburg (DE); Marina Fleischhauer, Langenbrücken (DE); Sebastian Metzger, Augsburg (DE)

(73) Assignee: BK GIULINI GMBH, Ludwigshafen (DE)

( * ) Notice: Subject to any disclaimer, the term of this patent is extended or adjusted under 35 U.S.C. 154(b) by 0 days.

(21) Appl. No.: 14/380,229

(22) PCT Filed: Nov. 28, 2012

(86) PCT No.: PCT/EP2012/004900
§ 371 (c)(1),
(2) Date: Aug. 21, 2014

(87) PCT Pub. No.: WO2013/087152
PCT Pub. Date: Jun. 20, 2013

(65) Prior Publication Data
US 2015/0014601 A1    Jan. 15, 2015

(30) Foreign Application Priority Data

Dec. 12, 2011    (EP) .................................... 11009764

(51) Int. Cl.
*H01M 4/58*    (2010.01)
*H01M 4/62*    (2006.01)
*C01B 25/45*    (2006.01)

(52) U.S. Cl.
CPC ........... *H01M 4/5825* (2013.01); *C01B 25/45* (2013.01); *H01M 4/625* (2013.01); *C01P 2006/40* (2013.01)

(58) Field of Classification Search
CPC ..... H01M 4/5825; H01M 4/625; C01B 25/45; C01P 2006/40
See application file for complete search history.

(56) References Cited

U.S. PATENT DOCUMENTS

| | | | |
|---|---|---|---|
| 2,072,063 A * | 2/1937 | Alton | 209/2 |
| 7,662,424 B2 * | 2/2010 | Kurihara et al. | 427/58 |
| 2004/0151649 A1 * | 8/2004 | Hemmer et al. | 423/306 |
| 2004/0241546 A1 * | 12/2004 | Hatta et al. | 429/231.1 |
| 2005/0064289 A1 * | 3/2005 | Suzuki et al. | 429/209 |
| 2006/0093938 A1 * | 5/2006 | Stulc et al. | 430/108.3 |
| 2007/0054187 A1 | 3/2007 | Nuspl et al. | |
| 2008/0187838 A1 * | 8/2008 | Le | 429/231.95 |
| 2009/0134359 A1 * | 5/2009 | Watanabe | 252/301.6 F |
| 2010/0202951 A1 * | 8/2010 | Wu et al. | 423/305 |
| 2011/0117360 A1 * | 5/2011 | Izumi et al. | 428/329 |

FOREIGN PATENT DOCUMENTS

| | | |
|---|---|---|
| CA | 2 307 119 A1 | 10/2000 |
| DE | 103 53 266 A1 | 6/2005 |
| DE | 697 31 382 T2 | 2/2006 |
| EP | 1 195 838 A2 | 4/2002 |
| JP | 2000-040504 * | 2/2000 |

OTHER PUBLICATIONS

English Translation of JP 2000-040504.*
Wang et al. Cracking causing cyclic instability of LiFePO4 Journal of Power Sources 140 (2005) 125-128.*
Planetary Micro Mill PULVERISETTE 7 premium line—web description—evidenciary.*
International Search Report, PCT/EP2012/004900, dated Feb. 28, 2013, 3 pgs.
Bing Huang et al., "Synthesis and rate performance of lithium vanadium phosphate as cathode material for Li-ion batteries", Journal of Alloys and Compounds, vol. 509 (2011), pp. 475-4768.
International Preliminary Report on Patentability, PCT/EP2012/004900, dated Jun. 17, 2014, 6 pgs.

* cited by examiner

*Primary Examiner* — Peter F Godenschwager
*Assistant Examiner* — Andrew J Oyer
(74) *Attorney, Agent, or Firm* — Paul D. Strain, Esq.; Strain & Strain PLLC

(57) ABSTRACT

Method for the production of lithium metal phosphate, wherein a dry mixture containing a lithium compound, a metal compound, wherein the metal is selected from Fe, Mn and mixtures thereof, and a phosphate is provided, the dry mixture is converted to $LiMPO_4$ and the $LiMPO_4$ is wet ground by adding water and lithium polyacrylate and dried.

30 Claims, No Drawings

METHOD FOR PRODUCING LITHIUM METAL PHOSPHATE

CROSS-REFERENCE TO RELATED PATENT APPLICATIONS

This application is a National Stage of International Application No. PCT/EP2012/004900, filed Nov. 28, 2012, which is based upon and claims the benefit of priority from prior European Patent Application No. 11009764.9, filed Dec. 12, 2011, the entire contents of all of which are incorporated herein by reference in their entirety.

The present invention relates to a method for the production of lithium metal phosphate, which is suitable for use as cathode material in batteries, in particular secondary batteries.

Lithium metal phosphate compounds, which are used as electrode materials, are known in themselves. They may also be doped or coated with carbon. They are above all used as an electrode material in rechargeable, so-called secondary batteries.

A cathode material for secondary lithium batteries is known from DE 69731382 T2. Here, an $LiMePO_4$ compound having a regular olivine structure is disclosed, wherein Me can stand for iron, manganese, nickel and titanuim, or mixtures thereof.

The incorporation of conductive carbon in such electrode materials is known from CA 2,307,119 A1.

US 2008/0187838 A1 discloses lithium polyacrylates as binding agents in electrodes, which are required for the production of rechargeable batteries.

Lithium polyacrylate is a material, which is known in itself, of the formula $(C_3H_4O_2)_x \times Li$. It is commercially available as a clear liquid having a pH value of between 8 and 9 and a density of approx. 1.25 g/ml. In the prior art, lithium polyacrylate has already been used as a dispersant in the minerals industry—see EP 2 199 348 A1.

The electrodes known from US 2008/0187838, which are obtained by using lithium polyacrylate, have a higher lifespan with respect to their rechargeability. The cathodes or anodes may furthermore contain further additives, such as carbon particles, which increase the conductivity of the electrode. Lithium polyacrylate is described solely as a binding agent in US 2008/0187838 A1.

Furthermore, a method for the production of a compound $LiMPO_4$, having Fe, Mn, Co and/or Ni as M, is known from DE 103 53 266 A1, wherein the lithium iron phosphate has a very small particle size and low particle size distribution. The method described comprises the production of a precursor mixture made from a $Li^+$ source, a $M^{2+}$ source and a $PO_4^{3-}$ source, in order to produce a precursor suspension. There then follows a dispersion or grinding treatment of the precursor suspension until the $D_{90}$ value of the particles in the precursor suspension is less than 50 μm. $LiMPO_4$ is obtained from the ground precursor suspension, preferably by conversion under hydrothermal conditions.

The precursor suspension disclosed there is highly viscous and can only be mixed and stirred with difficulty. Furthermore, according to DE 103 53 266 A1, uniform, homogeneous crystals having a very low particle size distribution have to be produced. The $D_{90}$ values should preferably be from 10 to 15 μm, which was achieved by the dispersion in an Ultraturrax stirrer. The somewhat complex reaction control and the necessary individual dissolution of the reactants for the precursor mixture and dispersion of the precipitate or final product are disadvantages of this method that have hitherto not been solved.

Based on this prior art, the object arises to provide a simplified, more economical method for the production of lithium metal phosphates having highly homogeneous particle size distribution. The resulting lithium metal phosphates should be suitable for application as a battery material and should have no additional contamination by foreign ions.

This object is solved by the method having the features of claim 1. Embodiments of the method are set out in the dependent claims.

The method according to the invention for the production of a lithium metal phosphate electrode material comprises the following steps:

providing a dry mixture containing a lithium compound, a metal compound, wherein the metal is selected from Fe, Mn and mixtures thereof, and a phosphate, converting the dry mixture to $LiMPO_4$, wet grinding the $LiMPO_4$ by adding water and lithium polyacrylate, drying.

Surprisingly, it has been found that, by adding the lithium polyacrylate, the viscosity can be substantially reduced, such that the grindability of the $LiMPO_4$ is decisively improved: The lower the viscosity, the more easy and economical the grinding is or the finer the particles obtained are.

In contrast to the statements in DE 103 53 366, it is not necessary to carry out the grinding to a fineness level of $D_{90}$ of under 50 μm on a precursor suspension that exists before the conversion to $LiMPO_4$. By adding lithium polyacrylate according to the invention, the $LiMPO_4$ in an aqueous suspension can be ground down to the desired level of fineness. The high shearing forces required in DE 103 53 366 for the grinding of the precursor suspension are also not necessary.

The first step of the method according to the invention is the provision of a dry mixture, which contains $Li^+$-, $M^{2+}$- and $PO_4^{3-}$-ions. The dry mixture can be obtained in a simple manner by adding the reactants to a mixing device. No specific requirements are to be imposed on the mixing device. The mixing can preferably take place directly in the device for converting the dry mixture.

Lithium dihydrogen phosphate is preferred as the lithium compound, which at the same time also provides the required phosphate, such that no further phosphate is advantageously required. In addition, $Li^+$ and $PO_4^{3-}$ are present in the optimum stoichiometric proportion. The lithium compound should possess a high level of reactivity during dry grinding and should preferably be cost-effective and readily available. $LiPO_3$ was tested, but only has a very low level of reactivity. $LiOH$, $Li_2CO_3$ and $LiHCO_3$ are suitable.

Manganese carbonate, iron oxalate and, in particular, mixtures of manganese carbonate and iron oxalate are preferred as the metal compound. The dihydrate is preferably used as iron oxalate. As well as this, hydroxides, phosphates and reactive oxides are also possible. For the metal compound, those that have a sufficient and, even better, a high level of reactivity during dry grinding, low costs and ready availability, are also preferred.

What is particularly preferred is a mixture of manganese carbonate and iron oxalate in a molar ratio of from 6:1 to 2:1, in particular from 5:1 to 3:1 and particularly preferably of approximately 4:1.

If the phosphate is not introduced as a lithium or metal compound, or is not introduced by these to a sufficient degree, an additional phosphate source, such as phosphoric acid or $(NH_4)H2PO4/(NH4)2HPO4$, is required. The addition takes place, for example, as meta or ortho-phosphoric acid, pyrophosphoric acid, polyphosphoric acid, or preferably as a phosphate, hydrogen phosphate or dihydrogen phosphate of suitable cations. In this case, ammonium is preferred as the cation (besides lithium and iron and/or manganese respectively). Then, the pH value must be taken into consideration and acids or lyes arise as by-products (ammonia, non-converted $H_3PO_4$), which have to be removed or are conveyed to the waste water. No foreign ions such as $Na^+/K^{30}$ (reduction of $Li^+$ ionic mobility) or halides (aggressive with respect to supply and discharge pipes or metallic vessels) may be introduced into the system. All of this would increase costs and have a negative impact on the environment.

It has proved to be expedient if the molar ratio of $Li^+$ to $PO_4^{3-}$ ranges from 1.1:1 to 1:1.1, preferably it is approximately 1. Also, the molar ratio of $Li^+$ to metal$^{2+}$ preferably ranges from 1.1:1 to 1:1.1, and preferably is also approximately 1. It is particularly preferable for the compounds $LiH_2PO_4$:$MnCO_3$:Fe-oxalate to be used in a molar ratio of approximately 1:0.8:0.2.

In a preferred embodiment, carbon, preferably in the form of soot, is added to the dry mixture. The amount is from 1 to 30% by weight of the final product, preferably 5 to 20% by weight and particularly preferably approximately 10% by weight.

The dry mixture is then converted to $LiMPO_4$. This takes place in a solid body reaction. For a sufficient conversion speed, the reactants should be present with as fine a distribution as possible and/or the conversion should take place at high temperatures. A fine distribution can be achieved by grinding if the reactants are not already present sufficiently finely. Moreover, the conversion is typically carried out at high temperatures, e.g. at least 100° C., preferably at least 200° C. and in particular at least 250° C. The temperature has an upper limit due to the stability of the product, potentially increasing formation of undesired products and for reasons of cost-effectiveness. Heating to above the temperature, that allows a sufficiently fast conversion, is to be avoided for environmental and cost-related reasons. The conversion preferably takes place by grinding the dry mixture with subsequent tempering.

As a result of the energy input during grinding, the solid body reaction begins, which leads to the formation of $LiMPO_4$. In a suitable manner, the grinding is designed to be in a Planetary Mono Mill with balls, e.g. with $ZrO_2$ balls, preferably with balls that have a diameter ranging from 1.5 to 3 mm, particularly preferably 2 mm. The grinding preferably takes place in several grinding sequences, in which a pause is adhered to after a respective grinding duration. 5 to 15, preferably 6 to 10 grinding sequences have proved to be suitable. The number of grinding sequences can also be selected to be higher or lower. Thereby, the grinding duration is typically 10 to 20 minutes, preferably approximately 15 minutes, with the pauses being approximately 5 minutes. Both the pauses and the grinding duration can also be expanded or shortened by a few minutes. The particle size or particle size distribution achieved during this grinding is not relevant.

Tempering at a temperature ranging from 250° C. to 500° C., preferably at approximately 300° C., is subsequently carried out. The tempering typically takes place over a duration ranging from 5 to 15 hours, preferably approximately 10 hours. The tempering takes place in a protective gas atmosphere, particularly preferably in an $N_2$ and/or $H_2$ protective gas atmosphere.

The desired final particle size and particle size distribution of the $LiMPO_4$ is obtained by wet grinding wherein lithium polyacrylate is added. The wet grinding can also take place in a Planetary Mono Mill, just as the grinding that took place for the conversion. In a preferred variant, the entire method takes place in one and the same grinding container. Water is typically used as the liquid. Due to the addition of lithium polyacrylate, approximately 5 to 6 ml of water per g of $LiMPO_4$ is sufficient to obtain a suitable suspension for grinding. It is furthermore proposed to carry out the wet grinding in a grinding cup with balls that preferably have a diameter ranging from 0.3 to 0.7 mm, preferably 0.5 mm. Both the cup and the balls are preferably made from $ZrO_2$. It has moreover proved to be expedient to undertake the wet grinding over a duration of 20 minutes to 1.5 hours, preferably 30 minutes to 1 hour, at 500 to 800 rpm, preferably at approximately 650 rpm, and at a temperature ranging from 25 to 40° C. Due to the lithium polyacrylate, a viscosity level of the suspension in the range of 3500 to 7500 Pa s at a shear rate of 0.1 $s^{-1}$ results.

The wet grinding is typically carried out in such a way that the particle size ranges from 0.1 to 15 µm, in particular from 0.1 to 0.8 µm. The particle size $D_{90}$ of the $LiMPO_4$ should be smaller than 50 µm, preferably smaller than 15 µm. The average particle size $D_{50}$ is preferably 0.4 to 0.6 µm. The particle size $D_{10}$ is preferably greater than 0.05 µm, particularly preferably greater than 0.1 µm. All measurements of particle sizes took place in the scope of the present invention with a Mastersizer 2000 (by the company Malvern).

Furthermore, the amount of lithium polyacrylate preferably ranges from 0.005 to 2.0% by weight, in particular from 0.05 to 1% by weight, with respect to the total amount of lithium metal phosphate.

It is advantageous for the separation of the ground $LiMPO_4$ from the grinding bodies, e.g. the balls, used during wet grinding, to require less liquid than in grinding without lithium polyacrylate, despite the reduced amount of liquid during the grinding. Thus, the solid body content of the suspension after wet grinding is also higher, whereby energy saving and protection during the subsequent drying arise. The environment is also preserved, since less waste water arises and less energy is consumed. According to the invention, over 60% of washing water could be saved and a solids content of 20 to 60% could be obtained. The separation of, for example, $ZrO_2$ balls can advantageously take place by means of a vibrating screen and washing with water.

The drying can preferably take place by spray drying. Other methods are, however, also suitable.

The lithium metal phosphate that is obtained in the method according to the invention preferably corresponds to the formula $Li(Mn_xFe_{1-x})PO_4$, where x is from 0.9 to 0.7, and is preferably approximately 0.8. Moreover, it is preferred if 1 to 30% by weight, preferably 8 to 10% by weight of carbon, with respect to the total weight of the lithium metal phosphate, is contained.

The invention is to be illustrated with the aid of the following example, without, however, being limited to the specifically described embodiments. Insofar as nothing else is specified or occurs in a necessarily different manner depending on context, percentage values relate to the weight, and, in case of doubt, the total weight of the mixture.

The invention also relates to all combinations of preferred embodiments, insofar as these are not mutually exclusive. The specifications "about" or "approx." in connection with a numerical figure mean that values that are higher or lower by 10%, values that are higher or lower by 5% and in each case values that are higher or lower by 1% are included.

Dry Mixture

The target product is $Li(Mn_{0.8}Fe_{0.2})[PO_4]$ as the cathode material for lithium-ion batteries. $LiH_2PO_4$ 11.95 g, $MnCO_3$ 9.20 g, $Fe(C_2O_4)\cdot 2H_2O$ 3.60 g and "Carbon Black" 1.531 g, i.e. soot, were applied as reactants. The reactants were mixed into a dry mixture in the grinding cup of a Planetary Mono Mill Pulverisette 6 classic line (by the company Fritsch) after the weighing in the dry state.

Grinding

What followed was a grinding of the dry mixture with the aid of the Planetary Mono Mill with $ZrO_2$ balls with a 2 mm diameter at 650 rpm. Here, the temperature rose to approximately 110° C. due to the frictional heat.

There were initially 15 minutes of grinding, followed by a 5-minute pause. Then, with an altered direction of rotation, another 15 minutes of grinding and a 5-minute pause followed. These four actions were repeated 4 times (i.e. 8 grinding sequences), such that the entire duration was 160 minutes. After the first grinding process, the solid was scraped off the cover and wall of the grinding cup, reinserted and the grinding programme was repeated with a duration of 160 minutes. During the grinding, the solid body reaction of the reactants $LiH_2PO_4 + MnCO_3 + Fe(C_2O_4)$ to $Li(Mn_{0.8}Fe_{0.2})[PO_4]$ starts. The particle size was 200 nm to 50 μm and was very different and non-uniform.

Tempering

What followed was tempering of the ground dry mixture in an $N_2+H_2$ protective gas atmosphere. To that end, the dry mixture was separated from the grinding balls by sieving in a "Vibrations-Siebmaschine ANALYSETTE 3 pro" (by the company Fritsch) and inserted in corundum ($Al_2O_3$) vessels for a duration of approximately 10 hours in a tubular furnace with nitrogen flowing through it as the protective gas. The temperature of the tubular furnace was approximately 300° C. $Li(Mn_{0.8}Fe_{0.2})[PO_4]$ was obtained as black solid with a content of approximately 9% by weight of C.

Wet Grinding 27 or 18 g of the black solid formed during tempering was discharged with 150 or 100 ml water, 150 g $ZrO_2$ balls (0.5 mm diameter) and 0.5% by weight liquid lithium polyacrylate (0.09 g) into a 250 ml $ZrO_2$ grinding cup and was ground for one hour at 650 rpm and at a room temperature of 25° C. After the grinding process, the product was separated from the balls with the aid of a vibrating screen and water. 1 litre of water was required to separate the product from the grinding balls. The solids content during the grinding process was 18%.

The addition of lithium polyacrylate unexpectedly and advantageously brought about a liquefaction of the suspension and thus a reduction in viscosity, such that the small $ZrO_2$ balls (0.5 mm) therein are able to move more quickly. They hereby transfer more impact energy to the particles, whereby improved crushing is achieved. In addition, the product is exposed to no other alkali metal ions than lithium ions, such that a suitable level of product purity arises. The product can also be separated from the grinding balls with little water consumption.

Drying

The resulting suspension was spray-dried under the following conditions:
Flushing gas: 1000 l/h (50 mm height)
Inlet temperature: 200° C.
Aspirator: 35 m³/h (90%)
Peristaltic pump: 12 ml/min (40%)
Nozzle cleaning: 2

A black solid, which has the composition $Li(Mn0.8Fe0.2)[PO4]$ with a content of 8% b.w. of carbon, was obtained as the final product.

Comparative Example without Lithium Polyacrylate

A dry mixture was, as before, provided, ground and tempered from the same reactants. However, the wet grinding took place without lithium polyacrylate, in that a) 18 g solid+150 ml $H_2O$ or b) 12 g solid+100 ml $H_2O$ were subjected to the wet grinding under the same conditions as above. The separation of the product from the grinding balls requires 3 litres of water in each case.

Compared to this, in the example according to the invention with lithium polyacrylate, approximately 50% more solid per batch arose, and the water consumption during washing was reduced by 66%.

Rheological Measurements

The product of the tempering was mixed into the following suspensions with and without lithium polyacrylate with water.

Suspension 1:

| | |
|---|---|
| $Li(Mn_{0.8} Fe_{0.2})[PO_4]$/C 20% | 3.20 g |
| E - water | 3.00 g |
| Lithium polyacrylate | 0.03 g |
| Solids content | 51.36% |
| Lithium polyacrylate with respect to solid | 0.94% |

Suspension 2:

| | |
|---|---|
| $Li(Mn_{0.8} Fe_{0.2})[PO_4]$/C 20% | 3.20 g |
| E - water | 3.00 g |
| Lithium polyacrylate | 0.0156 g |
| Solids content | 51.48% |
| Lithium polyacrylate with respect to solid | 0.49% |

Suspension 3:

| | |
|---|---|
| $Li(Mn_{0.8} Fe_{0.2})[PO_4]$/C 20% | 3.20 g |
| E - water | 3.00 g |
| Lithium polyacrylate | 0.00 |
| Solids content | 51.48% |
| Lithium polyacrylate with respect to solid | 0.0% |

Directly after the production, viscosity curves were recorded with a rheometer of the brand Physica MCR 101 with a shear rate of 0.1 to 1000 $s^{-1}$. The viscosities are listed in Table 1.

TABLE 1

| Shear rate [$s^{-1}$] | Suspension 1 Viscosity [Pa · s] | Suspension 2 Viscosity [Pa · s] | Suspension 3 Viscosity [Pa · s] |
|---|---|---|---|
| 0.1 | 3,540 | 7,430 | 49,300 |
| 0.158 | 75.8 | 2,140 | 25,700 |
| 0.251 | 14 | 1,270 | 10,900 |
| 0.398 | 3.03 | 1,190 | 5,490 |
| 0.631 | 1.36 | 937 | 2,750 |
| 1 | 1.06 | 397 | 1,380 |
| 1.58 | 0.85 | 212 | 772 |
| 2.51 | 0.575 | 96.7 | 453 |
| 3.98 | 0.578 | 21.3 | 362 |
| 6.31 | 0.582 | 7.17 | 308 |
| 10 | 0.432 | 0.482 | 178 |
| 15.8 | 0.295 | 0.733 | 110 |
| 25.1 | 0.193 | 0.959 | 22.3 |
| 39.8 | 0.134 | 0.67 | 8.29 |

TABLE 1-continued

| Shear rate [s$^{-1}$] | Suspension 1 Viscosity [Pa · s] | Suspension 2 Viscosity [Pa · s] | Suspension 3 Viscosity [Pa · s] |
| --- | --- | --- | --- |
| 63.1 | 0.0696 | 0.0734 | 6 |
| 100 | 0.035 | 0.105 | 8.21 |
| 158 | 0.0678 | 0.549 | 1.33 |
| 251 | 0.123 | 0.816 | 1.5 |
| 398 | 0.0722 | 0.27 | 1.13 |
| 631 | 0.0651 | 0.54 | 0.647 |
| 1,000 | 0.0341 | 0.116 | 0.442 |

Suspensions 1 and 2 with the use of lithium polyacrylate showed a clearly reduced level of viscosity compared to suspension 3 without the addition of lithium polyacrylate.

The invention claimed is:

1. A method for the production of lithium metal phosphate material for use in subsequent electrode formation, the method comprising:
   providing a dry mixture containing a lithium compound, a metal compound, wherein the metal is selected from Fe, Mn and mixtures thereof, and a phosphate,
   converting the dry mixture to LiMPO$_4$,
   wet grinding the LiMPO$_4$ by adding water and a grinding aid lithium polyacrylate to obtain particle size ranging from 0.1 to 15 μm, wherein the grinding aid is lithium polyacrylate, and
   drying to form a raw material for use in subsequent electrode formation,
   wherein the amount of lithium polyacrylate ranges from 0.005 to 2.0% by weight relative to the total amount of the lithium metal phosphate.

2. The method according to claim 1, wherein the conversion takes place by grinding the dry mixture and tempering the ground dry mixture.

3. The method according to claim 1, wherein the lithium compound comprises lithium dihydrogen phosphate.

4. The method according to claim 1, wherein the metal compound comprises a compound selected from the group consisting of manganese carbonate, iron oxalate, and a mixture of manganese carbonate and iron oxalate.

5. The method according to claim 1, further comprising adding particulate carbon to the dry mixture.

6. The method according to claim 2, wherein the grinding of the dry mixture is carried out in a Planetary Mono Mill with ZrO$_2$ balls.

7. The method according to claim 2, wherein the grinding of the dry mixture takes place over at least 6 grinding sequences, wherein one grinding sequence comprises 12 to 20 minutes of grinding duration and a pause of approximately 5 minutes.

8. The method according to claim 2, wherein the tempering of the dry mixture takes place in a protective gas atmosphere at a temperature ranging from 250° C. to 500° C. and over a duration ranging from 5 to 15 hours.

9. The method according to claim 1, wherein the wet grinding takes place over a duration of 30 minutes to 1 hour at approximately 650 rpm and at a temperature ranging from 25 to 40° C.

10. The method according to claim 1, wherein 5 to 6 ml of water is added to the converted dry mixture per g of LiMPO$_4$.

11. The method according to claim 1, wherein the LiMPO$_4$ is separated from the grinding bodies after the wet grinding by means of a vibrating screen and water.

12. The method according to claim 1, wherein the drying is carried out as spray drying.

13. The method according to claim 1, wherein the lithium metal phosphate has the formula Li(Mn$_x$ Fe$_{1-x}$)[PO$_4$], wherein x stands for a number ranging from 0.9 to 0.7.

14. The method according to claim 1, wherein 1 to 30% by weight of carbon, with respect to the weight of the lithium metal phosphate, is contained in the dry mixture.

15. A method for the production of lithium metal phosphate material for use in subsequent electrode formation, the method comprising:
   providing a dry mixture containing a lithium compound, a metal compound, wherein the metal is selected from Fe, Mn and mixtures thereof, and a phosphate,
   converting the dry mixture to LiMPO$_4$,
   wet grinding the LiMPO$_4$ by adding water and lithium polyacrylate, and
   drying, wherein the drying is carried out as spray drying, wherein the amount of lithium polyacrylate ranges from 0.005 to 2.0% by weight relative to the total amount of the lithium metal phosphate.

16. A method for the production of lithium metal phosphate material for use in subsequent electrode formation, the method comprising:
   providing a dry mixture containing a lithium compound, a metal compound, wherein the metal is selected from Fe, Mn and mixtures thereof, and a phosphate,
   converting the dry mixture to LiMPO$_4$,
   wet grinding the LiMPO$_4$ by adding water and lithium polyacrylate,
   drying to obtain a powder,
   wherein the amount of lithium polyacrylate ranges from 0.005 to 2.0% by weight relative to the total amount of the lithium metal phosphate.

17. The method according to claim 16, wherein the conversion takes place by grinding the dry mixture and tempering the ground dry mixture.

18. The method according to claim 16, wherein the lithium compound comprises lithium dihydrogen phosphate.

19. The method according to claim 16, wherein the metal compound comprises a compound selected from the group consisting of manganese carbonate, iron oxalate, and a mixture of manganese carbonate and iron oxalate.

20. The method according to claim 16, further comprising adding particulate carbon to the dry mixture.

21. The method according to claim 17, wherein the grinding of the dry mixture is carried out in a Planetary Mono Mill with ZrO$_2$ balls.

22. The method according to claim 17, wherein the grinding of the dry mixture takes place over at least 6 grinding sequences, wherein one grinding sequence comprises 12 to 20 minutes of grinding duration and a pause of approximately 5 minutes.

23. The method according to claim 17, wherein the tempering of the dry mixture takes place in a protective gas atmosphere at a temperature ranging from 250° C. to 500° C. and over a duration ranging from 5 to 15 hours.

24. The method according to claim 16, wherein the wet grinding takes place over a duration of 30 minutes to 1 hour at approximately 650 rpm and at a temperature ranging from 25 to 40° C.

25. The method according to claim 16, wherein 5 to 6 ml of water is added to the converted dry mixture per g of LiMPO$_4$.

26. The method according to claim 16, wherein the LiMPO$_4$ is separated from the grinding bodies after the wet grinding by means of a vibrating screen and water.

27. The method according to claim 16, wherein the drying is carried out as spray drying.

28. The method according to claim 16, wherein the lithium metal phosphate has the formula $Li(Mn_x Fe_{1-x})[PO_4]$, wherein x stands for a number ranging from 0.9 to 0.7.

29. The method according to claim 16, wherein 1 to 30% by weight of carbon, with respect to the weight of the lithium metal phosphate, is contained.

30. The method according to claim 1, wherein the $LiMPO_4$ particle size prior to the wet grinding step ranges from approximately 200 nm to approximately 50 μm.

* * * * *